METHOD OF MAKING AN ELECTRICAL CONNECTION

Original Filed Nov. 13, 1958 2 Sheets-Sheet 1

INVENTOR.
Edgar W. Forney, Jr.
BY
Curtis, Morris & Safford

METHOD OF MAKING AN ELECTRICAL CONNECTION

Original Filed Nov. 13, 1958 2 Sheets-Sheet 2

INVENTOR.
EDGAR W. FORNEY, JR.

BY
Curtis, Morris & Safford

United States Patent Office

Re. 25,847
Reissued Aug. 31, 1965

25,847
METHOD OF MAKING AN ELECTRICAL CONNECTION

Edgar W. Forney, Jr., Harrisburg, Pa., assignor to AMP Incorporated, Harrisburg, Pa.

Original No. 3,010,184, dated Nov. 28, 1961, Ser. No. 773,638, Nov. 13, 1958. Application for reissue Sept. 30, 1963, Ser. No. 313,150
6 Claims. (Cl. 29—155.55)

Matter enclosed in heavy brackets [ ] appears in the original patent but forms no part of this reissue specification; matter printed in italics indicates the additions made by reissue.

This application is a continuation in part of my copending application Serial No. 623,956, filed November 23, 1956, for Crimping Connection and Method.

This invention relates particularly to electrical connectors and connections although it has utility in other environments. It is an object of the invention to provide a substantially moistureproof and fluid impervious electrical connection between a ferrule and a conductor. A further object is to provide an improved seal between a conductor and a sheath extending thereover. A still further object of the invention is to provide a method of reducing the diameter of a substantially cylindrical ferrule of circular cross section while the ferrule is positioned on a cylindrical member thereby to reform the ferrule in such a manner that it is, after reforming, in constrictive embracing relationship with the cylindrical member.

These and other objects of the invention are achieved in a preferred embodiment in which the ferrule is positioned in surrounding relationship to the conductor and it is then forced into a female die having a width less than the diameter of the ferrule so that the ferrule is flattened and the conductor is pinched between the sides thereof. Thereafter, and while the ferrule is contained within the die, *it is* compressed along its long axis until it is again formed into a substantially right circular cylinder of a diameter less than its initial diameter. At the conclusion of this operation, the ferrule is in constrictive embracing relationship to the conductor around its entire periphery. The invention has utility in forming substantially fluid-impervious seals between a conductor and a sheath of elastomeric material arranged concentrically with respect thereto. Thus, if the ends of two wires are spliced in any maner, a sheath can be placed around the splice and the sheath sealed to the conductors at each end thereof, whereby the electrical connection between the wire ends is substantially hermetically sealed and is suited for usage in corrosive environments. The invention also has utility in the formation of certain electrical connections between wires and ferrules and particularly solid wires since the initially circular ferrule can be reduced in its diameter into constrictive embracing relationship with the wire in a manner which ensures a permanent and highly conductive electrical joinder of the parts and, in addition, a mechanical connection having a high degree of mechanical strength and resistance to deleterious effects such as vibration and corrosion.

Figure 1:
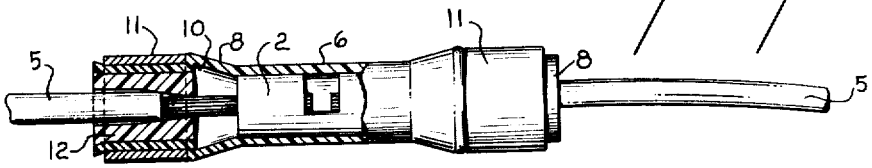
FIGURE 1 is a side view partly in section of one form of splice connector for two wires in accordance with the invention.
Figure 2:
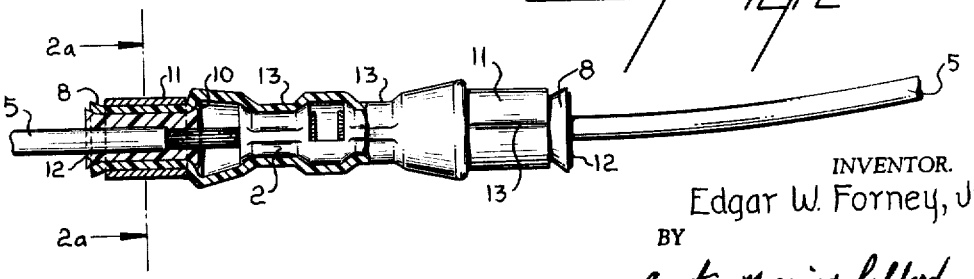
FIGURE 2 is a view similar to FIGURE 1 but showing the parts after the connector has been crimped and the sealing ring constricted.

Referring now to FIGURES 1 and 2, in a preferred embodiment, there is provided a wire connector ferrule 2 which receives the stripped ends 4 of a pair of conductors 5 which are to be connected. Wire ferrule 2 may be, for example, of the type shown in the United States patent to Broske No. 2,478,082 and is provided with a plastic sleeve or sheath 6 which extends axially for a substantial distance beyond its ends. Sleeve or sheath 6 has a frusto-conical transition section 8 beyond the ends of ferrule 2 and beyond this transistion section there is provided a shoulder 10 against which is positioned a cylindrical ferrule 11. A bushing or adaptor 12 is fitted within the open end of sleeve 6 and is centrally apertured for reception of conductor 5. Advantageously, as shown in FIGURE 1, this aperture in bushing 12 tapers towards ferrule 2 so that the insulated conductor can be partially inserted into the bushing while the exposed strands 4 extend through the narrow open end of the bushing and into the ferrule 2.

In use, a suitable crimping tool is employed to crimp ferrule 2 onto the wire ends as is commonly known to the art and as is described in the aforementioned Broske Patent No. 2,478,082. The crimped sections shown at 13 in FIGURE 2 establish the electrical connection between the two conductors 5.

In order to establish a substantially fluid-impervious seal at the end of the sheath 6, the ferrule 11 is reduced in diameter, or constricted, until it is in constrictive embracing relationship with the sleeve or sheath 6, the bushing 12, and with the insulation 5 of the wire. It will be apparent from FIGURE 2 that after such constriction of the ferrule, the ferrule is longitudinally extruded somewhat and the bushing and the insulating sheath are compressed radially inwardly against the insulation 5. Since the bushing is compressed substantially uniformly around its entire periphery, there are substantially no irregularities in the circular section shown such as would form small passages which would admit fluids.

Figure 3:
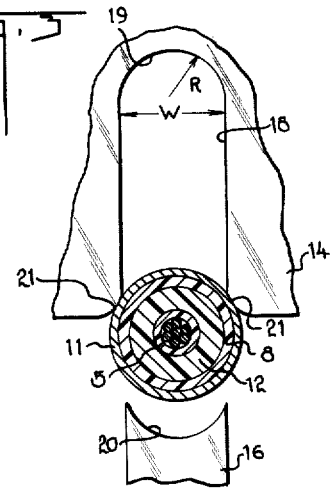
FIGURES 3, 4, 5 and 6 are fragmentary views illustrating the successive stages in the constricting of the sealing ring about the conductor.
Figure 4:
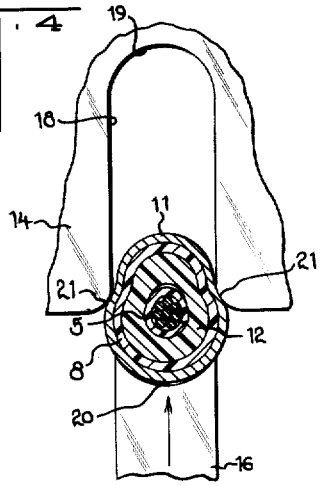

Turning now to FIGURES 3–6, the ferrule 11 is constricted by means of a die set comprising a female die 14 and a male die 16. These dies may be mounted on a suitable press or on a hand tool for relative motion towards and away from each other. Female die 14 has a recess having parallel sides 18 which merge with a semicylindrical portion 19. The width W of this recess will in all instances be less than the diameter of the ferrule 11 as indicated in FIGURE 3 the radius R of semicircular portion 19 is equal to the radius desired in the constricted ferrule. Advantageously, the mouth of this recess is rounded as shown at 21 to facilitate entry of the ferrule as shown in FIGURE 4. Die 16 has a concave upper surface 20 which is of substantially the same radius R as the base of the recess 18. The width of die 16 should closely approach the width of W of the recess in the female die for reasons which will be explained below.

Figure 5:
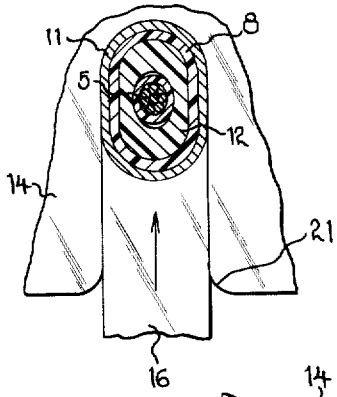

In practice, the ferrule 11 is positioned as shown in FIGURE 3 and the ram or tool on which the dies are mounted is actuated to drive the male die relatively towards the female die. As shown in FIGURE 4, ferrule 11 is initially forced into the recess in the female die and the ferrule is reformed at this time until it has a substantially oval-shaped cross-section as best shown in FIGURE 5. During the step illustrated at FIGURES 4 and 5, the bushing 11 is compressed from opposite sides and, depending upon its elastic properties, may be longitudinally or axially extruded somewhat.

Figure 6:
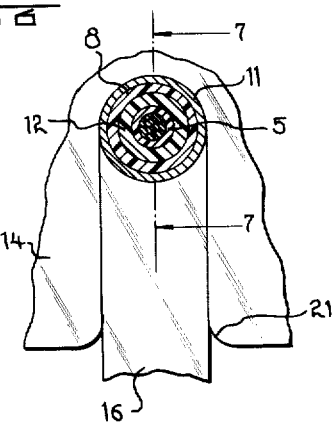

After the ferrule 11 has been formed as shown in FIGURE 5, the dies are further driven towards each other to compress the ferrule and to again form it into a right circular cylinder having a substantially circular cross-section as shown in FIGURE 6. During this final step, bushing 12 is further compressed and longitudinally extruded and ferrule 11 is also longitudinally or axially extruded to some extent. The sheath 6 is also compressed and extruded beneath ferrule 11. The finished seal and connection can then be removed from the dies and the ferrule will retain its shape substantially as shown in FIGURE 6. The seal produced by this method is substantially moisture proof by reason of the fact that the bushing 12 and the sheath 6 are uniformly compressed around their entire peripheries onto the insulation 5 of the conductor. Many of the prior art moisture proof seals of this type attempted to achieve a high degree of moisture resistance by flattening the ferrule. In general, many of these attempts were not fully successful by reason of the fact that abrupt bends were formed in the cross section of the finished seal and passages eventually opened up at these bends which admitted fluids.

For best results several precautions should be followed in practicing the invention as follows. The bushing 12 should be of a relatively hard but elastic material such as neoprene and the ferrule 11 should be of relatively soft copper or other highly ductile metal. It will be apparent from an examination of FIGURES 3–6 that the sides of the ferrule as shown in FIGURE 5 are restrained from collapsing inwardly towards each other by the bushing 12, therefore, if this bushing is of an extremely soft material, it may not present sufficient resistance to the ferrule and such collapsing may take place. On the other hand, if this bushing is of relatively hard material, it will prevent inward collapse of the ferrule so that the ferrule will extrude longitudinally rather than collapse. In effect, the bushing (or the wire in alternative embodiments described below) functions as a resilient mandrel over which the ferrule is extruded during the constricting operation. After the ferrule has been constricted, the bushing tends to return to its original shape but is prevented from doing so by the constrictive effect of the ferrule. Thus, the bushing stores energy elastically and its surfaces are continuously urged outwardly against the sheath 6 and inwardly against the wire and its insulation to establish the desired moisture-proof seal. The ferrule 11 should be of a relatively soft and ductile metal such as soft copper although metal somewhat harder than soft copper may be used if desired or necessary in order to permit assembly of the ferrules to the sheaths. In any event, it is apparent that a balance of properties of the ferrule and the bushing must be maintained for success. The bushing must be sufficiently hard to prevent inward collapse of the ferrule but should not be overly stiff or hard since the harder this member is, the more energy required to perform the constricting operation. The ferrules should be relatively soft so that it will flow axially upon crimping rather than collapse inwardly as explained above.

Figure 7:
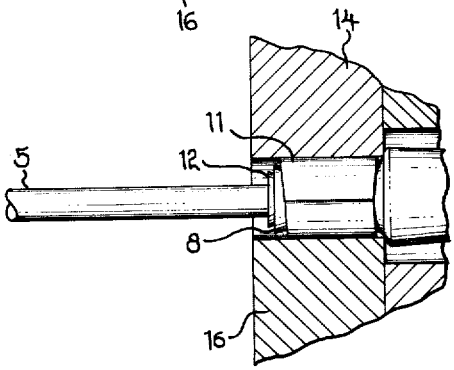
FIGURE 7 is a view taken along the lines 7—7 of FIGURE 6.

It will be noted from FIGURE 7 that the die 14 is of a length which is greater than the length of the ferrule 11 after constriction thereof about the bushing and it will be noted from FIGURE 5 that the depth of the recess 18 is sufficient to accommodate the entire cross-section of the ferrule after it has been ovalled. The ferrule is thus confined around its entire periphery and through its entire length during all stages of the constricting operation. This arrangement is advisable for best results since it ensures that the ferrule will be axially extruded during the constricting operation and the pressures developed during the operation will not be relieved.

It has been found in practice that the diameter of the ferrule may advantageously be reduced by 20% to 30% where the bushing is of neoprene and the ferrule is of soft copper. These limits are not critical, however, and greater or lesser reduction might be found to give good results depending upon the physical properties of the parts and their dimensions. For example, where the copper ferrule is initially in a work hardened condition it can not be extruded by the same amount as a soft copper ferrule and the optimum degree of constriction might be less than 20%. Under such circumstances it would be desirable to have the wire fit relatively snugly within aperture in the plug in order that the seal will be substantially impermeable even though the degree of constriction is relatively low. It might be found to be practicable to reduce the ferrule diameter by an amount greater than 30%, particularly if the aperture in the bushing is relatively large with respect to the wire diameter, since the bushing must tightly embrace the wire to ensure a good seal.

The ferrule should be relatively thin walled in order that it might be extruded without the exertion of an unduly high force, but should, of course be adequate for purposes of strength. For example, where the plug is of neoprene having a hardness of about Durometer A7D and having a diameter of 0.375 inch, good results are obtained if the ferrule has a wall thickness of 0.015 inch and a length of 0.280 inch. Where the parts are of these sizes, the ferrule can be constricted by means of a force multiplying hand tool. It has been found that the ferrule is extruded by a somewhat greater amount in those sections which are in contact with the female die so that the finished constricted ferrule is somewhat longer at its top, as shown in FIGURE 7, than at its bottom. This condition does not, however, detract from the effectiveness of the seal.

As mentioned above, the width of the male die should be almost equal to the width W of the recess of the female die. As a practical matter, the width of the male die must be slightly less than W in order to permit entry of the die into the recess. As a result of the fact that the fit is less than perfect, a small amount of the metal of the ferrule may be extruded downwardly, as viewed in FIGURE 5, between the recess and the sides of the die and die marks 13 may appear on external surface of the constricted ferrule. These die marks do not detract from the effectiveness of the seal since the cross sectional configuration of the parts is substantially circular and their arrangement is substantially concentric. Of course, the benefits of the invention will be at least partially lost if the width of the male die is grossly less than the width W of the recess since, under such circumstances, the metal will merely extrude downwardly as viewed in FIGURE 5 and the internal diameter of the ferrule will not be reduced sufficiently to compress the plug and establish the seal.

Figure 8:
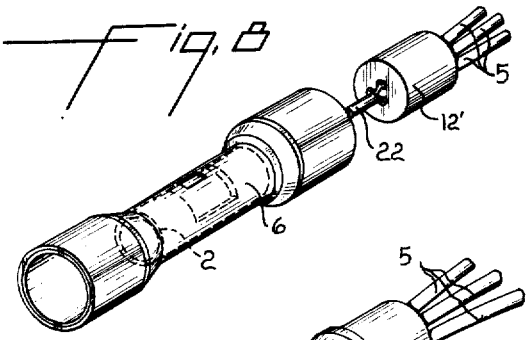
FIGURES 8 and 9 are perspective views of an alternative embodiment of the invention before and after crimping and constricting which embodiment is adapted to connect a plurality of conductors.
Figure 10:
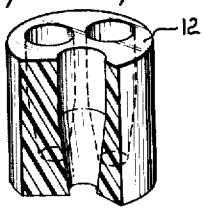
FIGURE 10 is an enlarged sectional view with parts broken away of a bushing which forms part of the embodiment of FIGURES 8 and 9.
Figure 9:
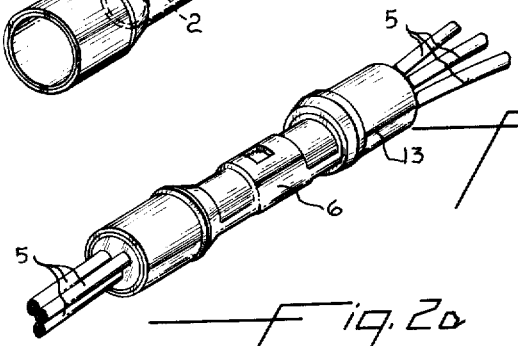
Figure 2A:
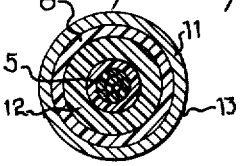
FIGURE 2A is a view taken along the lines 2—2 of FIGURE 2.

Referring now to FIGURES 8 and 9, in an alternative embodiment of the invention a plurality of wires 5′ can be connected together at a common point by the use of bushing 12′ having a plurality of openings therein. It will be noted in FIGURE 10 that the bushing has the openings substantially symmetrically arranged so that the pressure developed during the constricting operation is evenly distributed. It is also desirable in this embodiment to gather the strands of the conductor and secure them together by means of a relatively small ferrule 22 to ensure their entry into the connector or wire ferrule 2.

Figure 11:
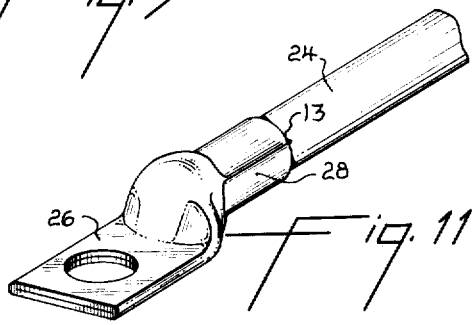
FIGURE 11 is a perspective view of an electrical connection between a solid wire and a terminal in accordance with the invention.

FIGURE 11 shows an embodiment in which a constricted tubular ferrule 28 of a terminal 26 establishes the electrical and mechanical connection between this terminal and a solid conductor 24. The present method of reducing the diameter of a circular ferrule by first ovaling it and then reforming it into a cylinder of circular cross section has been found to have substantial advantages in making electrical-mechanical connections between a ferrule and a solid wire. In this embodiment, the conductor 24 extends into the ferrule 28 and functions in the same manner as the plug 12 of the embodiment of FIGURE 1.

While I have shown only preferred embodiments of my invention obvious modifications thereof will be apparent to those skilled in the art. For example, it is contemplated that in some circumstances the bushing 12 might be eliminated in the embodiment of FIGURE 1 particularly if the sheath 6 fits relatively closely over the insulated conductor 5. Under such circumstances of course, the sheath and the wire insulation which are of plastic, rubber, or other elastic material, would function in the same manner as the bushing functions in the embodiment of FIGURE 1 and would be circumferentially compressed by the ferrule. It should also be mentioned that seals in accordance with the invention are useful for high altitude (i.e. low ambient pressure) environments since at such low pressures there is a greater tendency for corona discharges to take place than is the case under conditions of atmospheric pressure. Corona discharges can be prevented under low pressure conditions by sealing the electrical connections in accordance with the invention.

I claim:

1. The method of compressing a ferrule of substantially circular cross section onto a conductor extending therein comprising the steps of: forcing said ferrule into a female die having a width which is less than the diameter of said ferrule and a depth which is greater than the diameter of the ferrule thereby partially to flatten said ferrule and to impart to it a substantially oval-shaped cross section and to pinch said conductor between the sides of said ferrule, and thereafter and while said ferrule is retained in said female die, compressing said ferrule by application of a compressing force along the major axis of its oval cross section to reduce said major axis until said ferrule is again of substantially circular cross section and is in constrictive embracing relationship with said conductor.

2. The method of forming a substantially impermeable seal between an insulated conductor and a sleeve in surrounding relationship thereto and having a substantially circular ferrule thereon comprising the steps of: forcing said ferrule into a female die having a width less than the diameter of said ferrule thereby partially to flatten said ferrule and to impart to it a substantially oval-shaped section while pinching said sleeve and said conductor along opposite sides, and thereafter compressing said ferrule along its major axis to axially extrude said ferrule and to impart to its ferrule a substantially circular cross section having a diameter substantially equal to the width of said die and to compress said sleeve around said conductor.

*3. The method of compressing a ferrule of substantially circular cross section onto a conductor member extending therein comprising the steps of: forcing said ferrule into a female die having a width which is less than the diameter of said ferrule and a depth which is greater than the diameter of the ferrule thereby partially to flatten said ferrule and to impart to it a substantially oval-shaped cross section and to pitch said conductor member between the sides of said ferrule, and thereafter and while said ferrule is retained in said female die, compressing said ferrule along the length thereof by application of a compressing force along the major axis of its oval cross section to reduce said major axis until said ferrule is again of substantially circular cross section and is in constrictive embracing relationship with said conductor member.*

*4. The method of forming a substantially impermeable seal between conductor members in end-to-end abutting relationship and having a substantially circular ferrule thereon comprising the steps of: forcing said ferrule into a female die having a width less than the diameter of said ferrule thereby partially to flatten said ferrule and to impart to it a substantially oval-shaped cross section while pinching said conductor members along opposite sides, and thereafter compressing said ferrule along its major axis and along the length thereof to axially extrude said ferrule and to impart thereto a substantially circular cross section having a diameter substantially equal to the width of said die and to compress said ferrule around said conductor members.*

*5. The method according to claim 4 wherein a sleeve member is interposed between said conductor members and said ferrule.*

*6. The method of forming a substantially impermeable seal between conductor members in telescopic relationship and having a substantially circular ferrule thereon comprising the steps of: forcing said ferrule into a female die having a width less than the diameter of said ferrule thereby partially to flatten said ferrule and to impart to it a substantially oval-shaped cross section while pinching said conductor members along opposite sides, and thereafter compressing said ferrule along its major axis and along the length thereof to axially extrude said ferrule and to impart thereto a substantially circular cross section having a diameter substantially equal to the width of said die and to compress said ferrule around said conductor members.*

References Cited by the Examiner

The following references, cited by the Examiner, are of record in the patented file of this patent or the original patent.

UNITED STATES PATENTS

| | | | |
|---|---|---|---|
| 1,227,726 | 5/17 | Woodhead | 29—155.55 |
| 1,368,480 | 2/21 | Brown | 29—518 |
| 1,727,895 | 9/29 | Mraz | 29—518 X |
| 2,148,392 | 2/39 | Ransome | 174—84.1 |
| 2,476,731 | 7/49 | Hobbs | 29—518 X |
| 2,729,695 | 1/56 | Pierce | 174—84.1 |
| 2,751,570 | 6/56 | Broske | 339—276 X |
| 2,763,849 | 9/56 | Betts | 339—276 |
| 2,774,810 | 12/56 | Ritter | 174—84.1 |
| 2,800,523 | 7/57 | Sidenmark et al. | 174—77 |
| 3,010,183 | 11/61 | Forney | 29—155.55 |

WHITMORE A. WILTZ, *Primary Examiner.*